US012586502B2

(12) United States Patent　　　　(10) Patent No.:　US 12,586,502 B2
Shih et al.　　　　　　　　　　　　　(45) Date of Patent:　　Mar. 24, 2026

(54) INTEGRATED DRIVING DEVICE AND OPERATION METHOD THEREOF

(71) Applicant: Novatek Microelectronics Corp., Hsinchu (TW)

(72) Inventors: Wei-Lun Shih, Hsinchu City (TW); Wu-Wei Lin, Taoyuan City (TW); Jiun-Jie Tsai, Hsinchu County (TW); Huang-Chin Tang, Hsinchu County (TW); Ching-Chun Lin, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/595,470

(22) Filed: Mar. 5, 2024

(65) Prior Publication Data

US 2024/0212551 A1　　Jun. 27, 2024

Related U.S. Application Data

(63) Continuation of application No. 17/241,091, filed on Apr. 27, 2021, now Pat. No. 11,922,844.

(60) Provisional application No. 63/015,698, filed on Apr. 27, 2020.

(51) Int. Cl.
*G09G 3/20*　　　(2006.01)
*G06F 3/041*　　(2006.01)
*G06V 40/13*　　(2022.01)

(52) U.S. Cl.
CPC ............. *G09G 3/20* (2013.01); *G06F 3/0412* (2013.01); *G06F 3/04166* (2019.05); *G06F 3/04184* (2019.05); *G06V 40/1318* (2022.01); *G09G 2310/0286* (2013.01); *G09G 2360/144* (2013.01)

(58) Field of Classification Search
CPC ...... G06V 40/12–1394; G06F 3/04166; G06F 3/0418–04186
See application file for complete search history.

(56) References Cited

U.S. PATENT DOCUMENTS

| | | | | |
|---|---|---|---|---|
| 4,818,856 A * | 4/1989 | Matsushima | ...... | G06K 7/10881 |
| | | | | 235/462.11 |
| 7,391,408 B1 * | 6/2008 | Chen | ..................... | H10F 55/155 |
| | | | | 250/214 LS |
| 10,755,070 B2 * | 8/2020 | Kim | ................... | G06V 40/1312 |
| 10,761,653 B2 * | 9/2020 | Weng | .................... | G06F 3/0412 |
| 10,878,780 B2 * | 12/2020 | Zhu | ...................... | G09G 3/3208 |
| 10,916,219 B2 * | 2/2021 | Liu | ...................... | G09G 3/2003 |
| 11,030,435 B1 * | 6/2021 | Hung | ................ | G06V 40/1318 |
| 11,036,952 B2 * | 6/2021 | Hung | .................... | G06V 40/13 |

(Continued)

*Primary Examiner* — Patrick F Marinelli

(74) *Attorney, Agent, or Firm* — JCIPRNET

(57) ABSTRACT

An integrated driving device is provided. The integrated driving device includes a touch sensing circuit and an optical sensing circuit. The touch sensing circuit is configured to perform touch sensing in a plurality of touch sensing periods during a first frame period. The optical sensing circuit is configured to perform optical sensing during at least one optical sensing period during the first frame period to obtain optical sensing signals for generating first ambient light information. The touch sensing periods and the optical sensing period are non-overlapping. Correspondingly, an operation method of an integrated driving device is also provided.

8 Claims, 18 Drawing Sheets

(56)                    References Cited

U.S. PATENT DOCUMENTS

| | | | | |
|---|---|---|---|---|
| 11,093,080 | B2 * | 8/2021 | Chen | G06V 40/1347 |
| 11,113,496 | B1 * | 9/2021 | Zhou | G06V 40/13 |
| 11,200,399 | B1 * | 12/2021 | Yang | G06V 40/1318 |
| 11,244,137 | B2 * | 2/2022 | Chang | G06V 40/1306 |
| 11,302,102 | B2 * | 4/2022 | Liu | G06V 40/1347 |
| 2012/0313913 | A1 * | 12/2012 | Shiraki | G06F 3/0412 |
| | | | | 345/207 |
| 2018/0173923 | A1 * | 6/2018 | Lee | G02F 1/13452 |
| 2019/0095671 | A1 * | 3/2019 | Yeke Yazdandoost | |
| | | | | G06V 10/145 |
| 2019/0103446 | A1 * | 4/2019 | Jang | H10K 59/40 |
| 2019/0180075 | A1 * | 6/2019 | Kim | G06V 40/1312 |
| 2020/0066229 | A1 * | 2/2020 | Zhu | G09G 5/10 |
| 2020/0134285 | A1 * | 4/2020 | Hung | G06F 3/0416 |
| 2020/0183563 | A1 * | 6/2020 | Weng | G06F 3/04166 |
| 2020/0210065 | A1 * | 7/2020 | Chen | G06V 40/1335 |
| 2020/0250288 | A1 * | 8/2020 | Lin | G06V 40/10 |
| 2020/0320956 | A1 * | 10/2020 | Liu | G09G 3/2092 |
| 2020/0327301 | A1 * | 10/2020 | Shih | G06F 3/04166 |
| 2021/0191545 | A1 * | 6/2021 | Zhang | H05K 1/189 |
| 2021/0192168 | A1 * | 6/2021 | Chang | G06F 3/0443 |
| 2021/0224505 | A1 * | 7/2021 | Liu | G06V 40/1347 |
| 2021/0224548 | A1 * | 7/2021 | Shih | G06V 20/46 |
| 2021/0266483 | A1 * | 8/2021 | Cheng | G01J 1/4228 |
| 2021/0303815 | A1 * | 9/2021 | Chung | G06V 40/1318 |
| 2021/0326561 | A1 * | 10/2021 | Qiu | H10F 39/8053 |
| 2021/0365660 | A1 * | 11/2021 | Chen | G06V 40/1318 |
| 2022/0012454 | A1 * | 1/2022 | Lin | G06F 3/0446 |
| 2022/0050984 | A1 * | 2/2022 | Park | G06V 40/1318 |
| 2022/0050993 | A1 * | 2/2022 | Chung | G06F 3/0412 |
| 2022/0058368 | A1 * | 2/2022 | Chang | G06V 40/1306 |
| 2022/0092287 | A1 * | 3/2022 | Shih | G06F 3/0412 |
| 2022/0171494 | A1 * | 6/2022 | Shih | G06F 3/04883 |
| 2024/0212551 | A1 * | 6/2024 | Shih | G06F 3/04184 |

* cited by examiner

INTEGRATED DRIVING DEVICE AND OPERATION METHOD THEREOF

CROSS-REFERENCE TO RELATED APPLICATION

This application is a continuation application of and claims the priority benefit of a prior application Ser. No. 17/241,091, filed on Apr. 27, 2021, which claims the priority benefit of U.S. provisional application Ser. No. 63/015,698, filed on Apr. 27, 2020. The entirety of each of the above-mentioned patent applications is hereby incorporated by reference herein and made a part of this specification.

BACKGROUND

Technical Field

The disclosure relates to an integrated driving device configured to perform in-display fingerprint recognition. In particular, an in-display fingerprint recognition module in the integrated driving device may also be configured to detect ambient light.

Description of Related Art

An ambient light sensor in an electronic device is configured to sense intensity of ambient light in the surroundings. The electronic device includes, for example, a mobile phone or other types of handheld electronic devices. Taking a mobile phone as an example, the ambient light sensor is usually disposed near a receiver of the mobile phone. According to sensed ambient light information, the mobile phone may automatically adjust brightness of a screen to maintain an optimal visual effect of the screen while saving power. The ambient light sensor may also be accompanied with other sensors to detect whether the mobile phone is placed in a pocket to prevent accidental touch.

SUMMARY

In an integrated driving device of the disclosure, an optical sensing circuit configured to perform in-display fingerprint recognition may also be configured to collect ambient light information.

The disclosure provides an integrated driving device. The integrated driving device includes a touch sensing circuit and an optical sensing circuit. The touch sensing circuit is configured to perform touch sensing in a plurality of touch sensing periods during a first frame period. The optical sensing circuit is configured to perform optical sensing during at least one optical sensing period during the first frame period to obtain optical sensing signals for generating first ambient light information. The touch sensing periods and the optical sensing period are non-overlapping.

The disclosure provides an operation method of an integrated driving device. The integrated driving device includes a touch sensing circuit and an optical sensing circuit. The operation method includes the following. Touch sensing is performed by the touch sensing circuit in a plurality of touch sensing periods during a first frame period. Optical sensing is performed by the optical sensing circuit during at least one optical sensing period during the first frame period to obtain optical sensing signals for generating first ambient light information. The touch sensing periods and the optical sensing period are non-overlapping.

The optical sensing circuit of the integrated driving device of the disclosure may be configured to perform ambient light sensing. In this way, configuration of an ambient light sensor in the handheld electronic device may be omitted.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the disclosure, it is intended to perform ambient light sensing through in-display optical sensor, and more particularly, through in-display optical fingerprint sensor. Thereby, a stand-alone ambient light sensor in a handheld electronic device may be removed.

Figure 1:
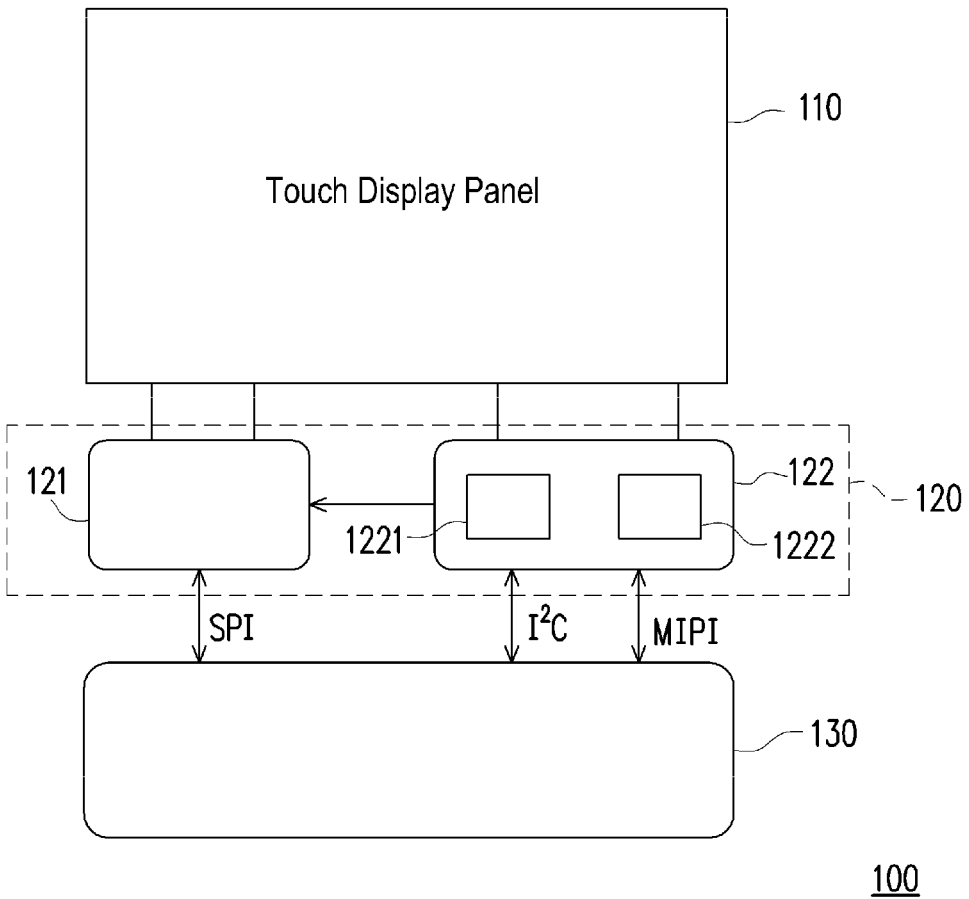
FIG. 1 is a block diagram showing a system of a handheld electronic device of the disclosure.

FIG. 1 is a block diagram showing a system of a handheld electronic device of the disclosure. With reference to FIG. 1, a handheld electronic device 100 of the disclosure includes a touch display panel 110, an integrated driving chip 120, and an application processor (AP) 130. A plurality of in-display optical sensors are disposed in the stack structure of the touch display panel 110 to form an optical sensing pixel array (not shown). The integrated driving chip 120 includes an optical sensing circuit 121 and a touch and display driving integrated (TDDI) circuit 122 which are integrated. The TDDI circuit 122 includes a touch sensing circuit 1221 and a display driving circuit 1222. The optical sensing circuit 121 may be utilized for fingerprint sensing and in such a case, the optical sensing pixel array in the touch display panel 110 is adapted for fingerprint sensing. However, in other embodiments, the optical sensing circuit 121 and TDDI circuit 122 may also be independent chips, which is not limited by the disclosure.

In application of fingerprint sensing, the optical sensing pixel array in the touch display panel 110 receives returned light from a finger and the optical sensing circuit 121 reads out fingerprint sensing signals from the optical sensing pixel array and generates digital sensing data accordingly. In the disclosure, the optical sensing circuit 121 may be configured to perform optical sensing, including fingerprint sensing and ambient light sensing, and whatever fingerprint sensing signals or ambient light sensing signals are referred to as optical sensing signals.

In application of fingerprint sensing, the digital sensing data generated by the optical sensing circuit 121 is transmitted through a serial peripheral interface (SPI) bus to the application processor 130 of the handheld electronic device 100, such that the application processor 130 may generate one or more fingerprint images accordingly and perform fingerprint recognition. The TDDI circuit 122 reports touch coordinates to the application processor 130 through an inter-integrated circuit bus (I²C Bus), and receives display data sent by the application processor 130 through a mobile industry processor interface (MIPI). Also, the TDDI circuit 122 outputs a control signal to the optical sensing circuit 121 to control the optical sensing circuit 121 to read out the fingerprint sensing signal. In view of optical sensing pixels which are used for ambient light sensing, the ambient light sensing operation is basically the same as fingerprint sensing operation, which both include reset, exposure, and readout procedures. The optical sensing circuit 121 is only turned on when performing optical sensing, and is turned off and not in use during the other time.

Figure 2:
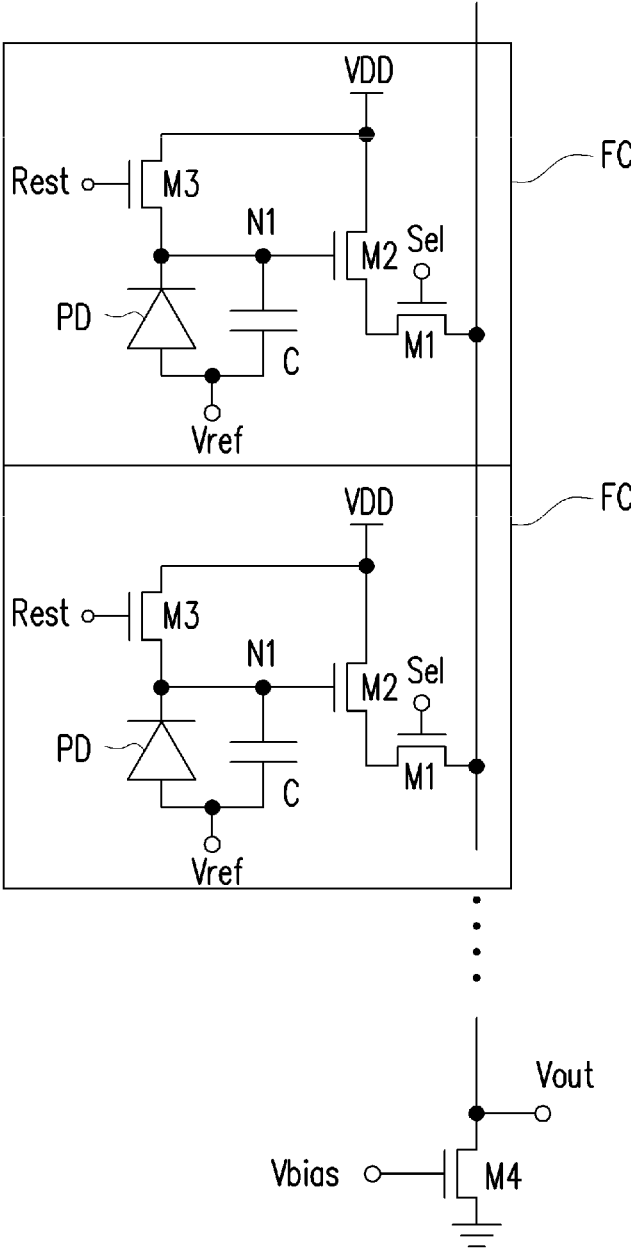
FIG. 2 is a schematic diagram partially showing a circuit of a sensing pixel array under a touch display screen of the disclosure.

FIG. 2 is a schematic diagram partially showing a circuit of a sensing pixel array of the disclosure. With reference to FIG. 2, a sensing pixel array in the touch display panel 110 includes a plurality of fingerprint sensors FC. Each fingerprint sensor FC includes a photosensitive element PD, a capacitor C, and transistors M1 to M3. The photosensitive element PD is configured to convert an optical signal into an electrical signal. The photosensitive element PD is coupled in reverse bias between a node N1 and a reference voltage Vref and the capacitor C is also coupled between the node N1 and the reference voltage Vref. The transistor M1 is controlled by a selection signal Sel that causes the fingerprint sensor FC to be selected, such that an output voltage Vout as the sensing signal can be read out through a sensing line. The transistor M2 serves as a source follower. The transistor M3 is controlled by a reset signal Rest, to reset a voltage of the gate (which is the node N1) of the source follower transistor M2 to an operating voltage VDD. A transistor M4, served as a current source, is controlled by a bias voltage Vbias. When the photosensitive element PD is exposed to light, the capacitor C begins to discharge, causing the voltage of the node N1 to drop. Through turning on the transistor M1, the output voltage Vout that follows the voltage of the node N1 is read out.

In an embodiment, the fingerprint sensor is embedded in the touch display panel 110 (e.g., an LCD panel). A pixel data voltage output and an optical sensing signal input may share a pinout of the integrated driving chip 120. The integrated driving chip 120 time-divisionally performs the display driving and the optical sensing and provides switching signals to switch the connection between sensing lines or data lines and the integrated driving chip 120. The optical sensing circuit 121 is also configured to provide timing control signals (including clock signals, start pulse signals, etc.) to a gate driver on array (GOA) circuit on the touch display panel 110 to generate gate control signals for the sensing pixel array. In the aspect of fingerprint sensing, the optical sensing circuit 121 is configured to output a plurality of start pulse signals to the GOA circuit on the touch display panel 110, and the GOA circuit is configured to generate a plurality of reset signals and a plurality of select signals with respect to a plurality of fingerprint sensing pixel rows of each sensing zone of a plurality of sensing zones of the sensing pixel array. Regarding to each sensing zone, the reset signals are utilized for sequentially resetting fingerprint sensing pixel rows in the sensing zone, and the readout signals are utilized for sequentially reading out fingerprint sensing signals from corresponding sensing pixels. In this way, the fingerprint sensing pixel rows may be controlled to perform, for example, reset, exposure, and readout procedures. Each fingerprint sensing pixel row starts exposure immediately after the reset operation is completed, and starts readout operation after the exposure is completed, so as to generate the fingerprint sensing signal.

Figure 3:
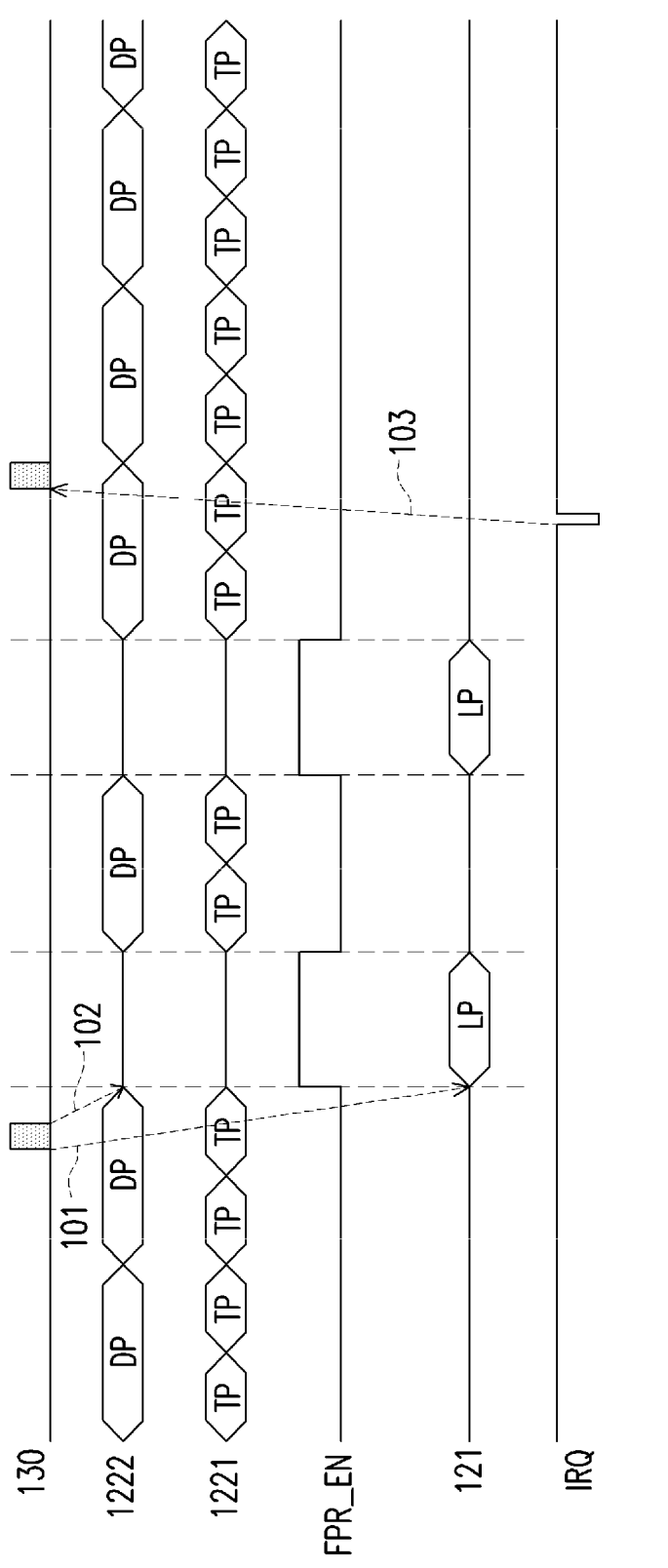
FIG. 3 is a timing diagram of display driving, touch sensing, and optical sensing according to an embodiment of the disclosure.

FIG. 3 is a timing diagram of display driving, touch sensing, and optical sensing according to an embodiment of the disclosure. In FIG. 3, DP denotes a display frame period in which display driving is active, TP denotes a touch frame period that touch sensing is active, and LP denotes a display frame period in which display driving is inactive (standby) and optical sensing is active. With reference to FIG. 1 and FIG. 3 together, before fingerprint recognition, the application processor 130 may send a wake-up instruction to the optical sensing circuit 121 (see a fine dashed line 101). The application processor 130 may also send a frame skip instruction to the TDDI circuit 122 (see a fine dashed line 102) causing the TDDI circuit 122 to enter a frame skip mode. FPR_EN represents a signal sent by the TDDI circuit 122 to the optical sensing circuit 121, which serves to notify the optical sensing circuit 121 of the time during which optical sensing may be performed. During a time interval when the signal FPR_EN is at a high voltage level, display driving and touch sensing are stopped and are in a standby state. During a time interval when the signal FPR_EN is at a low voltage level, display driving and touch sensing are active. Through detecting the signal FPR_EN, the optical sensing circuit 121 may collect optical information during the time interval when the signal FPR_EN is at a high voltage level, thereby avoiding interference from display driving and touch sensing. After required one or more fingerprint sensing cycles are completed, the optical sensing circuit 121 sends an interrupt request (IRQ) signal to notify the application processor 130 (see a fine dashed line 103), and returns to a standby state. At this time, the application processor 130 may issue the TDDI circuit 122 with an instruction to return to the active state.

Notably, the frame skip mode is a mode where the TDDI circuit 122 enters M consecutive skip periods after performing display driving and touch sensing in N consecutive active periods, where N and M are each a positive integer. In the M skip periods, at least one of display driving and touch sensing is stopped, and the optical sensing circuit 121 may perform optical sensing in the M skip periods. To put it simply, after entering the frame skip mode, the TDDI circuit 122 may first enter N active periods and then enter M skip periods. Alternatively, the TDDI circuit 122 may also first enter M skip periods and then enter N active periods.

In the disclosure, the optical sensing circuit 121 may perform not only fingerprint sensing but also ambient light sensing (collectively referred to as optical sensing). In an embodiment of the disclosure, during the optical sensing period, neither the display driving nor the touch sensing is active. In an embodiment of the disclosure, during the optical sensing period, the display driving is not active but the touch sensing is still performed, and the touch sensing and the optical sensing are active time-sensing zoneally. The reset operation and readout operation of optical sensing are required to be performed during the optical sensing period, but not limited to being completed within the same optical sensing period. Hereinafter, several embodiments will be used to describe details of display driving, touch sensing, and optical sensing (including fingerprint sensing and ambient light sensing) of the disclosure. In the following embodiments, DP, TP, and LP respectively represent the display driving period, the touch sensing period, and the optical sensing period. The term "optical sensing period" may be referred to a fingerprint sensing period FP or an ambient light sensing period LS, based on different tasks assigned to the sensing pixel array.

Figure 4:
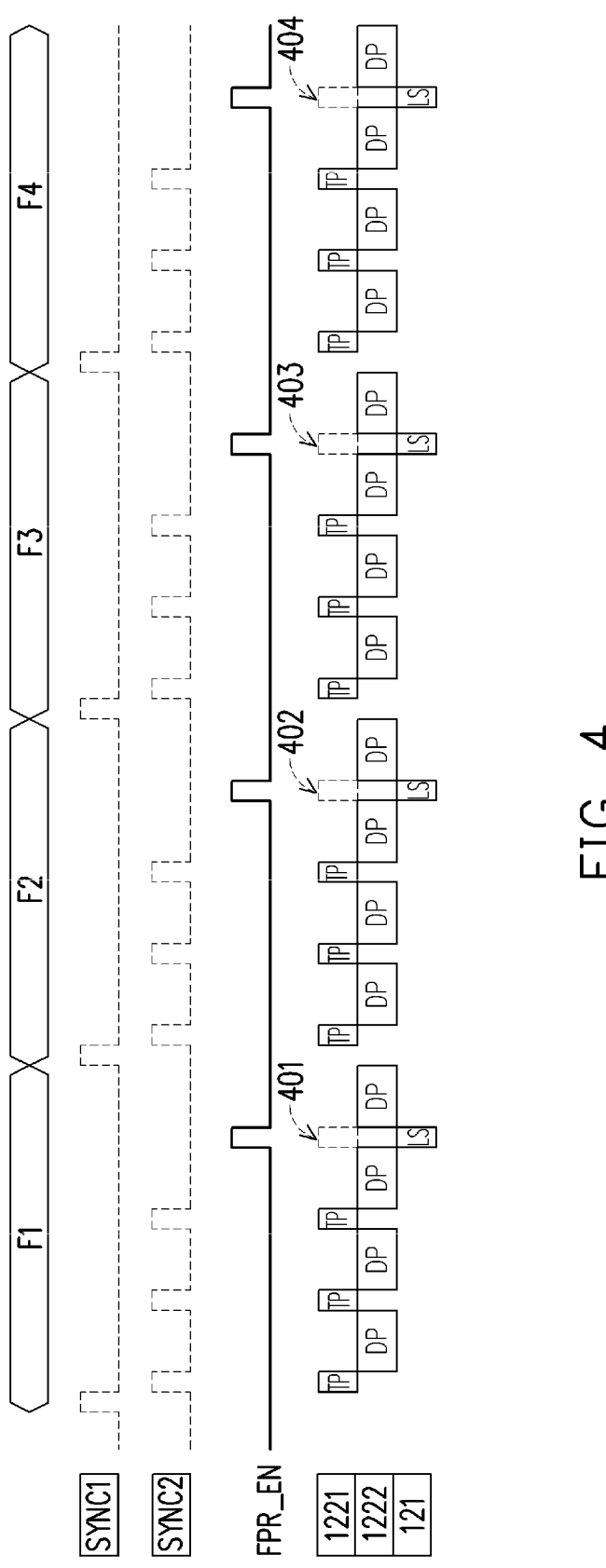
FIG. 4 is a timing diagram of display driving, touch sensing, and ambient light sensing according to an embodiment of the disclosure.

FIG. 4 is a timing diagram of display driving, touch sensing, and ambient light sensing according to an embodiment of the disclosure. In FIG. 4, SYNC1 represents a frame synchronization signal, which is configured to indicate the beginning of a frame period, such as frames F1 to F4. SYNC2 represents a touch synchronization signal, which is configured to indicate the touch sensing period. In this embodiment, a period when the touch synchronization signal SYNC2 is at a high voltage level corresponds to the touch sensing period TP, and a period when the touch synchronization signal SYNC2 is at a low voltage level corresponds to the display driving period DP. The TDDI circuit 122 is also configured to generate the signal FPR_EN to notify the optical sensing circuit 121 of the period LS during which ambient light sensing may be performed.

With reference to FIG. 1 and FIG. 4 together, during normal display mode in which the backlight is turned on, a part of the touch sensing periods serve as ambient light sensing periods. As shown in FIG. 4, the touch sensing periods TP and the display driving periods DP are time-sensing zoneally configured with each other. The periods at positions 401 to 404 not use for touch sensing and serve as the ambient light sensing periods LS. The TDDI circuit 122 outputs the signal FPR_EN to the optical sensing circuit 121 to notify the optical sensing circuit 121 of the periods at positions 401 to 404 (i.e., the ambient light sensing period LS) during which ambient light sensing may be performed. During the ambient light sensing period LS, touch sensing is paused, which may prevent interference with the result of ambient light sensing. Based on the signal FPR_EN, the optical sensing circuit 121 also provides start pulse signals with respect to different sensing zones and one or more clock signals to the GOA circuit on the touch display panel 110 such that the GOA circuit generates reset signals and select signals for an ambient light sensing cycle including reset, exposure and readout operations. Thereby, ambient light information may be obtained. Besides, although the periods 401 to 404 are available, how many available periods used for ambient light sensing is not limited in the disclosure.

Figure 5A:
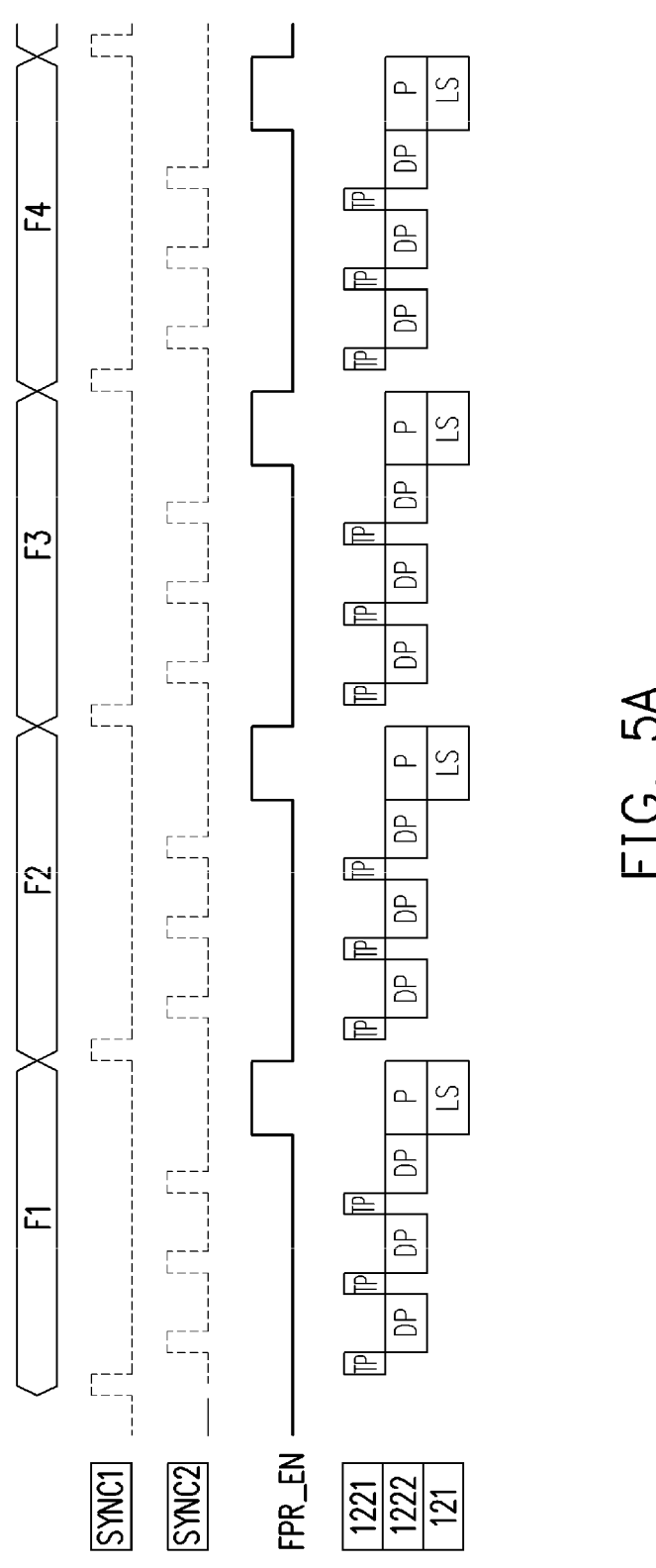
FIG. 5A is a timing diagram of display driving, touch sensing, and ambient light sensing according to an embodiment of the disclosure.

FIG. 5A is a timing diagram of display driving, touch sensing, and ambient light sensing according to an embodiment of the disclosure. In FIG. 5A, ambient light sensing is performed during a porch interval P during the normal display mode in which backlight is turned on. The porch interval P may be a front porch interval between the end of the last piece of data (which may be display data or touch sensing data) in a previous frame period and a frame synchronization (Vsync) pulse in a current frame period. Or, the porch interval may be a back porch interval between the frame synchronization (Vsync) of the current frame period and the beginning of the first piece of data (which may be display data or touch sensing data) of the current frame period. Or, the porch interval P may be a combination of the front porch interval and the back porch interval. Similarly, the TDDI circuit 122 outputs the signal FPR_EN to the optical sensing circuit 121 to notify the optical sensing circuit 121 of the period (i.e., the ambient light sensing period LS) during which ambient light sensing may be performed. Based on the signal FPR_EN, the optical sensing circuit 121 provides start pulse signals with respect to different sensing zones and one or more clock signals to the GOA circuit on the touch display panel 110 such that the GOA circuit generates reset signals and select signals for an ambient light sensing cycle including reset, exposure and readout operations. Thereby, ambient light information may be obtained. How many available porch intervals used for ambient light sensing is not limited in the disclosure.

Figure 5B:
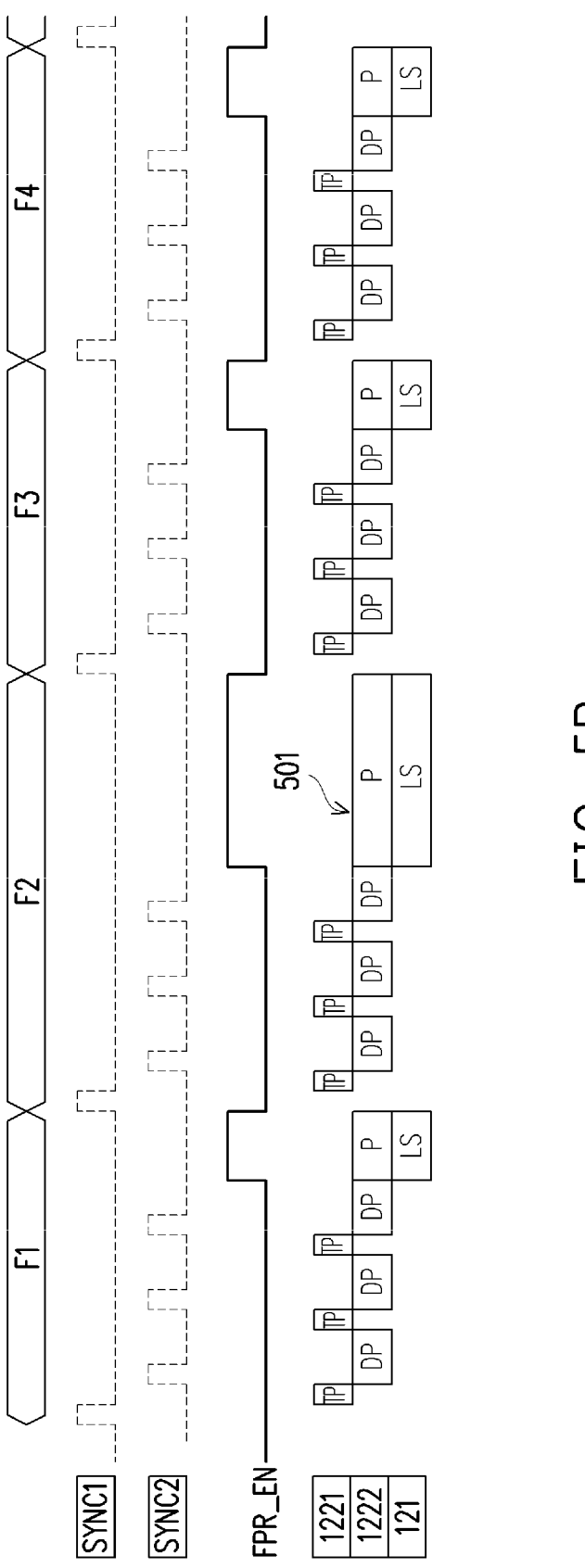
FIG. 5B is a timing diagram of display driving, touch sensing, and ambient light sensing according to an embodiment of the disclosure.

A length of the porch interval P for ambient light sensing is determined by the application processor 130. FIG. 5B is a timing diagram of display driving, touch sensing, and ambient light sensing according to an embodiment of the disclosure. A length of the porch interval P (see 501) in the frame period F2 in FIG. 5B is obviously longer than a length of the porch interval P in the frame period F2 in FIG. 5A. In the embodiments shown in FIG. 5A and FIG. 5B, the porch interval P in each frame period is configured for ambient light sensing. However, in other embodiments, ambient light sensing may also be periodically performed in M porch intervals P (whether continuous or not) in every N frame periods.

Figure 6:
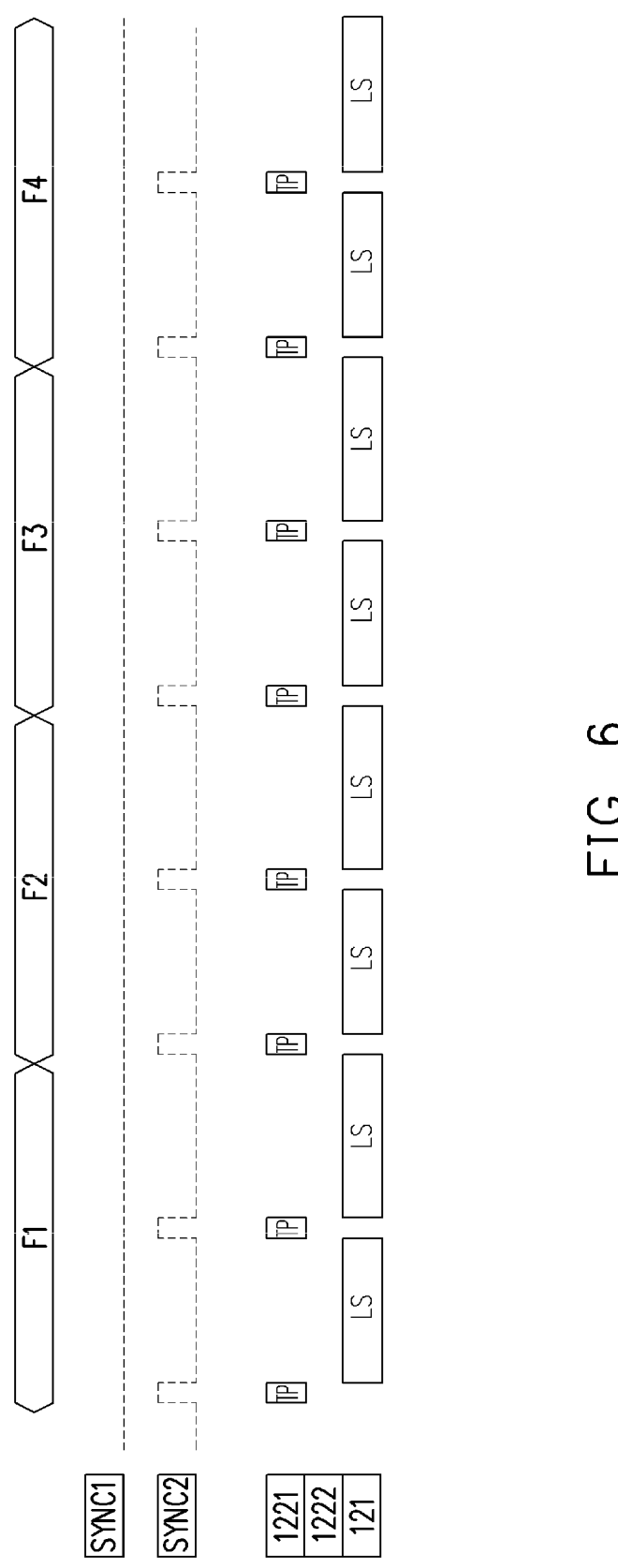
FIG. 6 is a timing diagram of display driving, touch sensing, and ambient light sensing according to an embodiment of the disclosure.

FIG. 6 is a timing diagram of display driving, touch sensing, and ambient light sensing according to an embodiment of the disclosure. With reference to FIG. 6, in an idle mode (which means the application processor 130 may enter a power saving mode and the display driving circuit 122 may also enter a power saving mode) in which the backlight is turned off, the touch sensing circuit 1221 is active but the display driving circuit 1222 is not active. Compared with the normal display mode with backlight turned-on, the frequency of touch sensing performed during the idle period may be reduced. In this embodiment, any period other than the touch sensing period TP may be capable of serving as the ambient light sensing period LS. In this embodiment, the TDDI circuit 122 outputs the signal FPR_EN to the optical sensing circuit 121 to notify the optical sensing circuit 121 of the period during which ambient light sensing may be performed. Based on the signal FPR_EN, the optical sensing circuit 121 provides start pulse signals with respect to different sensing zones and one or more clock signals to the GOA circuit on the touch display panel 110 such that the GOA circuit generates reset signals and select signals for an ambient light sensing cycle including reset, exposure and readout operations. Thereby, ambient light information may be obtained. Although the signal FPR_EN is not marked in FIG. 6, as mentioned earlier, a starting point and a length of the ambient light sensing period LS may be determined by the application processor 130, and may be notified by the application processor 130 to the TDDI circuit 122 to generate the signal FPR_EN.

Figures 7A, 7B:
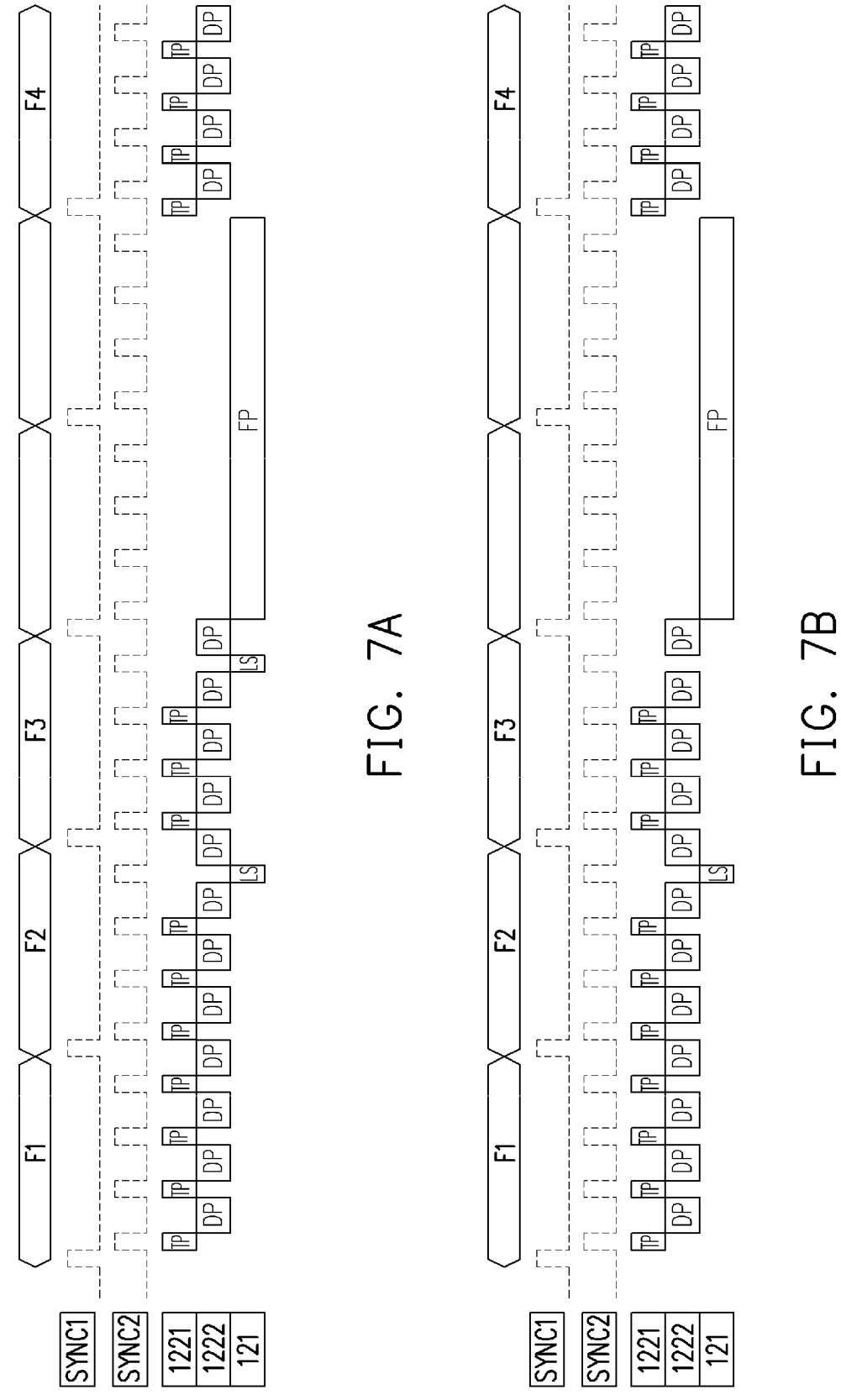
FIG. 7A and FIG. 7B are each a timing diagram of display driving, touch sensing, fingerprint sensing, and ambient light sensing according to an embodiment of the disclosure.

FIG. 7A and FIG. 7B are each a timing diagram of display driving, touch sensing, fingerprint sensing, and ambient light sensing according to an embodiment of the disclosure. Similarly, the signal FPR_EN is not marked in FIG. 7A and FIG. 7B. With reference to FIG. 7A and FIG. 7B together, during the normal display mode, the application processor 130 may send a wake-up instruction to the optical sensing circuit 121 before fingerprint recognition. Also, the application processor 130 may send a frame skip instruction to the TDDI circuit 122 causing the TDDI circuit 122 to enter a frame skip mode. In this embodiment, fingerprint sensing is performed during the skip periods (of which the length is equivalent to two frame periods, for example) in the frame skip mode. In this embodiment, before fingerprint sensing, one or more touch sensing periods TP during one or more frame periods (e.g., the frame periods F2 and F3) are occupied (which means, touch sensing is disabled) for sensing ambient light. In FIG. 7A, ambient light sensing is performed during an ambient light sensing period LS in each of the frame periods F2 and F3. In FIG. 7B, ambient light sensing is performed only during the ambient light sensing period LS in the frame period F2, what is at two frame periods earlier than fingerprint sensing. With the ambient light information reported by the optical sensing circuit 121, the application processor 130 knows in advance whether the handheld electronic device 100 is in a brighter environment or a darker environment. Accordingly, the application processor 130 may determine a length of an exposure period of the fingerprint sensor in a subsequent fingerprint sensing stage. In the presence of multiple ambient light sensing periods LS (as shown in FIG. 7A), the application processor 130 may also perform calculations on the ambient light information detected during multiple ambient light sensing periods LS to determine the length of the exposure period of the fingerprint sensor. In an embodiment, the ambient light information may also serve as a basis for adjusting a backlight brightness level of the touch display panel 110.

In detail, the optical sensing circuit 121 reports the ambient light information (whether obtained in the idle mode or normal display mode) after completing readout operation. In this way, the handheld electronic device 100 knows in advance whether the ambient light is strong or weak, and then dynamically determines the appropriate length of the exposure period of the fingerprint sensing cycle. If the ambient light is strong, a shorter exposure period may be set, to refrain from obtaining overexposed fingerprint images. If the ambient light is week, a longer exposure period may be set, to refrain from obtaining fingerprint images insufficient for recognition.

Figure 8:
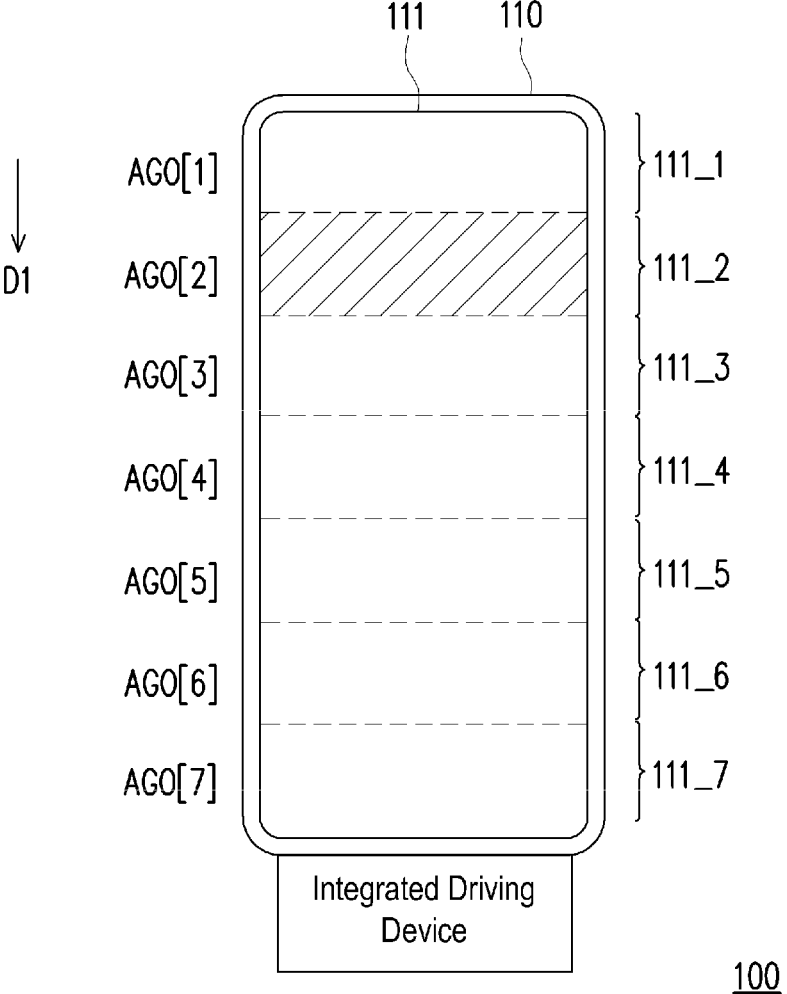
FIG. 8 is a schematic diagram showing zones of a sensing pixel array of a touch display panel according to an embodiment of the disclosure.

FIG. 8 is a schematic diagram showing sensing zones of a sensing pixel array of a touch display panel according to an embodiment of the disclosure. With reference to FIG. 8, the sensing pixel array 111 is divided into seven sensing zones 111_1 to 111_7 along a scanning direction D1 such as from up to down. Each sensing zone includes a plurality of fingerprint sensing pixel rows. AGO[1] to AGO[7] represent control signals provided from the optical sensing circuit 121 to the GOA circuit on the touch display panel, corresponding to the sensing zones, and each control signal among AGO[1] to AGO[7] is configured to reset or readout all the fingerprint sensing pixel rows of a respective sensing zone at the same time. In this embodiment, only one of the sensing zones, e.g., the sensing zone 111_2, is configured for ambient light detection. Through the GOA circuit on the control panel, all fingerprint sensing pixel rows in the sensing zone 111_2 are turned on (i.e., reset and readout) at the same time during the fingerprint sensing period. In other words, reset operation is performed on the fingerprint sensing pixel rows of the sensing zone 111_2 at the same time, and then readout operation on the fingerprint sensing pixel rows of the sensing zone 111_2 is performed thereon at the same time. In this case, the ambient light sensing signal read back through a sensing line is the summed result of the ambient light sensing signals of the multiple fingerprint sensing pixel rows. Ambient light information may be obtained through average brightness calculation on the ambient light sensing signals read back.

Figure 9A:
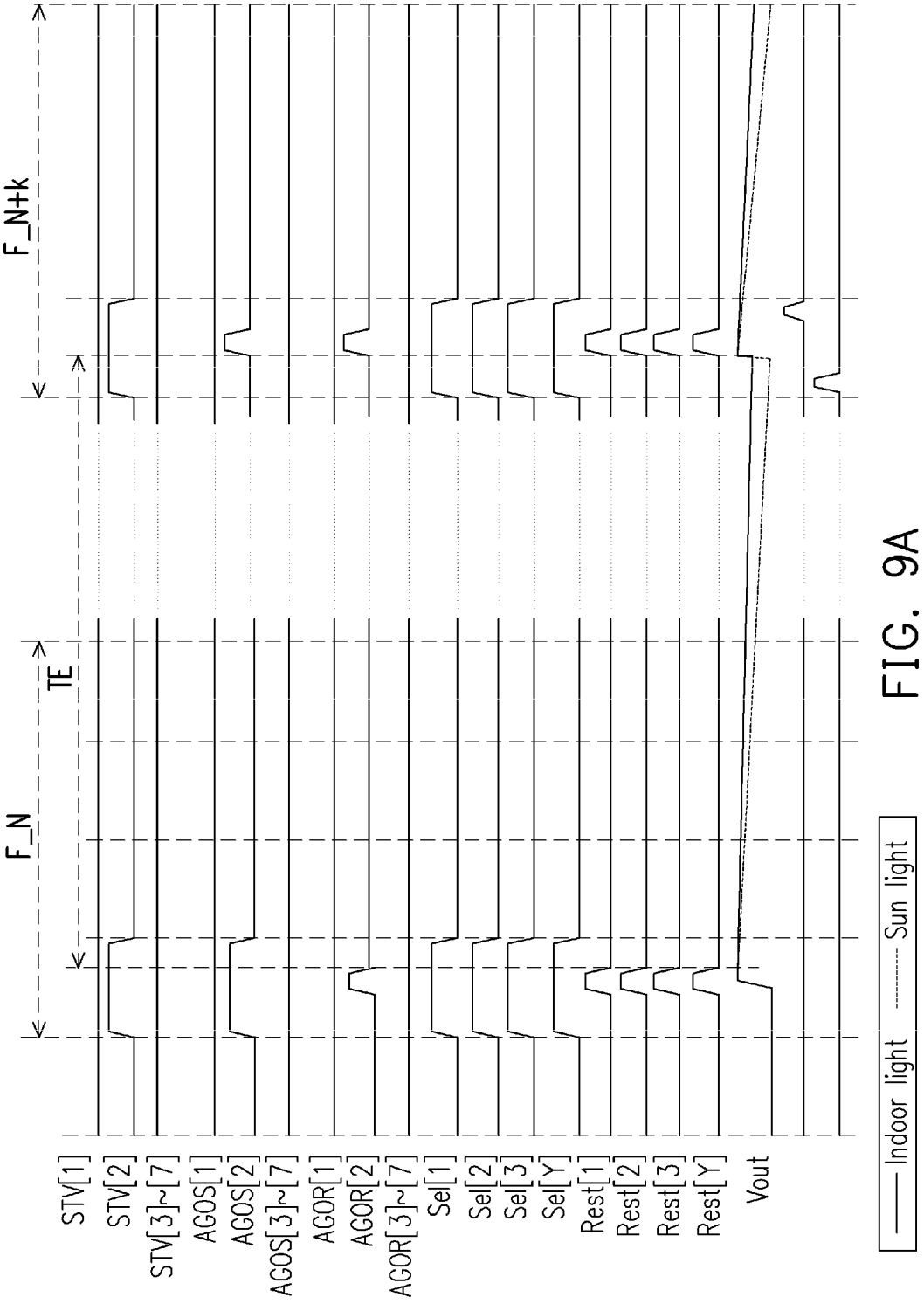
FIG. 9A is a timing diagram of ambient light sensing of a plurality of zones of a sensing pixel array according to an embodiment of the disclosure.

FIG. 9A is a timing diagram of ambient light sensing of a plurality of sensing zones of a sensing pixel array according to the embodiment of FIG. 8 of the disclosure. STV[1] to STV[7] in FIG. 9A respectively represent start pulse signals provided by the optical sensing circuit 121 to the GOA circuit, corresponding to the first sensing zone 111_1 to the seventh sensing zone 111_7. Each control signal among control signals AGOR[1] to AGOR[7] is configured to reset all the fingerprint sensing pixel rows of a respective sensing zone at the same time, and each control signal among control signals AGOS[1] to AGOS[7] is configured to readout all the fingerprint sensing pixel rows of the respective sensing zone at the same time, which means different optical sensing signals from different fingerprint sensing pixel rows may be readout through a sensing line at the same time instead of being sequentially readout. Rest[1] to Rest[Y] represent reset signals generated by the GOA circuit and provided to the Y fingerprint sensing pixel rows of the sensing zone 111_2. Sel[1] to Sel[Y] represent select signals generated by the GOA circuit and provided to the Y fingerprint sensing pixel rows of the sensing zone 111_2. Since only the sensing zone 111_2 is used for ambient light sensing, only the start pulse signal STV[2] has active start pulses and only the control signal AGOR[2] and the control signal AGOS[2] have active pulses. The start pulse signals STV[1] and STV[3] to STV[7] do not have active pulses. The control signals AGOR[1] and AGOR[3] to AGOR[7], the control signals AGOS[1] and AGOS[3] to AGOS[7] do not have active pulses. By the active pulse of the control signal AGOR[2] in an ambient sensing period of a frame period F_N, Rest[1] to Rest[Y] with respect to the sensing zone 111_2 are pulled to high (active) at the same time, such that all the fingerprint sensing pixel rows of the sensing zone 111_2 are reset at the same time in an ambient light sensing period. Next, by the active pulse of the control signal AGOS[2] in an ambient sensing period of a frame period F_N+k, where k may be 1 or any integer greater than 1.

Sel[1] to Sel[Y] with respect to the sensing zone 111_2 are pulled to high (active) at the same time, such that all the fingerprint sensing pixel rows of the sensing zone 111_2 are readout at the same time. Vout represents an output voltage (i.e., sensing signal) obtained from a sensing line. As shown, for performing ambient light sensing, multiple frame periods (from a frame period F_N to a frame period F_N+k) are required due to a long exposure period. In a case of k=1, two frame periods are required means that the end of the exposure period falls within the second frame period, and does not means that the exposure period fully takes two frame periods.

Nonetheless, the disclosure is not limited thereto. In other embodiments, fingerprint sensing pixel rows in any number and in any position may be set to be turned on (i.e. reset, and readout) at the same time. For example, the fingerprint sensing pixel rows of the second sensing zone 111_2 and the fifth sensing zone 111_5 may be turned on at the same time. Alternatively, the fingerprint sensing pixel rows of the second sensing zone 111_2, the fourth sensing zone 111_4, and the sixth sensing zone 111_6 may be turned on at the same time. In addition, in the disclosure, the number of ambient light sensing periods LS during one frame period for ambient light sensing is not limited. However, at least one ambient light sensing period LS is required.

Figure 9B:
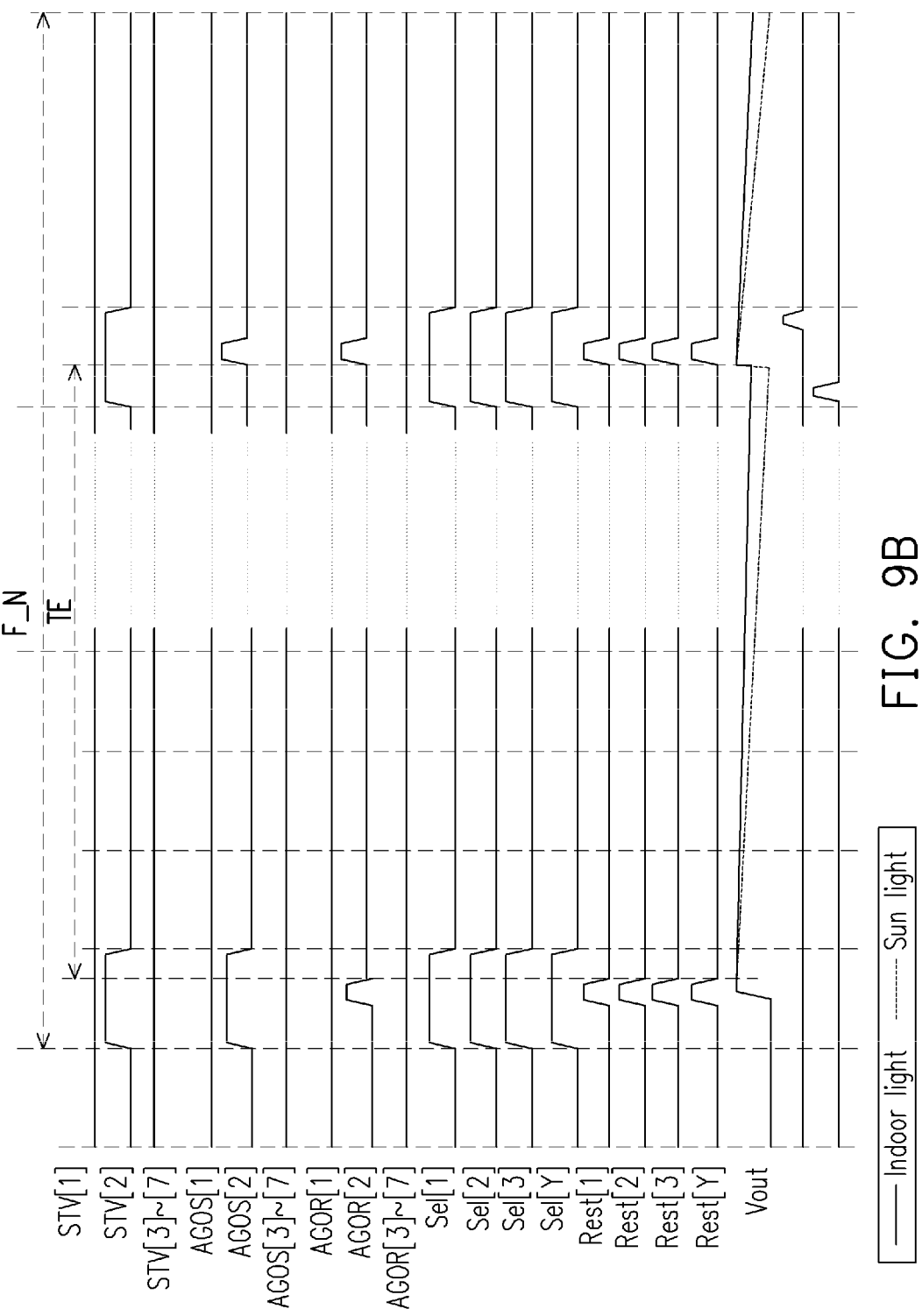
FIG. 9B is a timing diagram of ambient light sensing of a plurality of zones of a sensing pixel array according to an embodiment of the disclosure.

FIG. 9B is a timing diagram of ambient light sensing of a plurality of sensing zones of a sensing pixel array according to an embodiment of the disclosure. FIG. 9B is similarly further to describe the embodiment shown in FIG. 8. The difference between the two only lies in that, in FIG. 9B, the exposure is completed within one frame period. With reference to FIG. 9B, the fingerprint sensor of the second sensing zone 111_2 requires a short exposure period TE such that an ambient light sensing cycle may be completed in only one frame period F_N.

Figure 10:
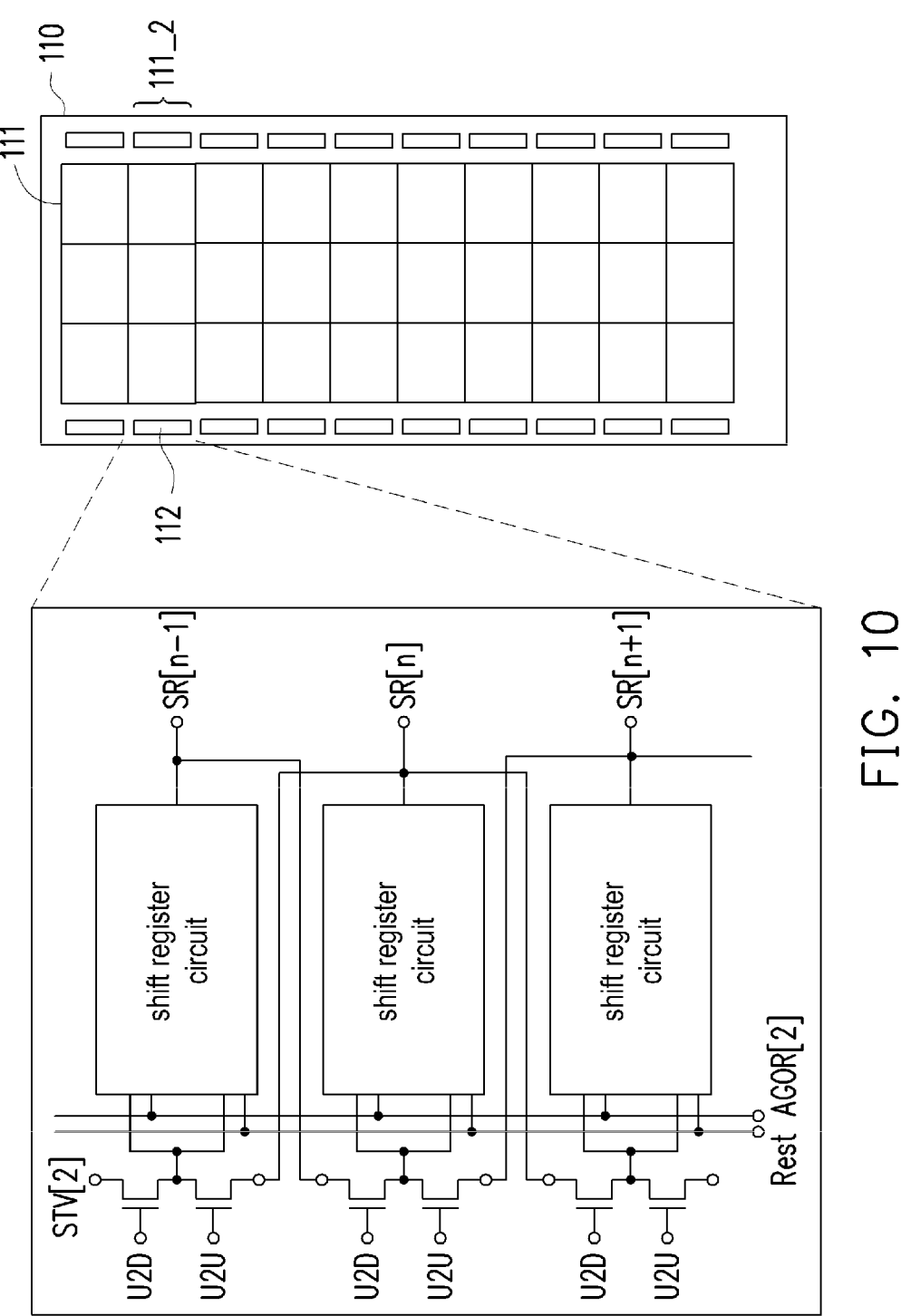
FIG. 10 is a schematic block diagram showing a GOA circuit according to an embodiment of the disclosure.

FIG. 10 is a schematic block diagram showing a GOA circuit according to an embodiment of the disclosure. With reference to FIG. 10, the touch display panel 110 is provided with the sensing pixel array 111 and a GOA circuit. Herein, a GOA circuit 112 disposed at the left side of the sensing pixel array 111 represents one of a plurality of similar circuits, for generating reset signals with respect to one sensing zone. There are also a plurality of circuits disposed at the right side of the sensing pixel array 111, wherein each circuit is similar to the GOA circuit 112, for generating select signals with respect to one sensing zone. The GOA circuit 112 includes a plurality of shift register circuits. For example, the GOA circuit 112 outputs a plurality of reset signals, including SR[n−1], SR[n], SR[n+1] and so on, to sensing pixel rows of the second sensing zone 111_2 of FIG. 10 according to a start pulse signal STV[2], a reset control signal AGOR[2], a first shift direction control signal U2D which enables a direction from up to down and a second shift direction control signal D2U which enables a direction from down to up. The two shift direction control signals are provided by the optical sensing circuit 121 and are configured to control the shift register circuits of the GOA circuit 112 to sequentially output active pulses either downward or upward. To perform ambient light sensing, the reset signals SR[n−1], SR[n], SR[n+1] and all other reset signals with respect to the sensing zone 111_2 are pulled high (active) at the same time by the reset control signal AGOR[2] such that the timing of reset operation like FIG. 9A or FIG. 9B can be realized. A reset signal Rest may be used for resetting the GOA circuit 112 with respect to the second sensing zone 111_2.

Figure 11B:
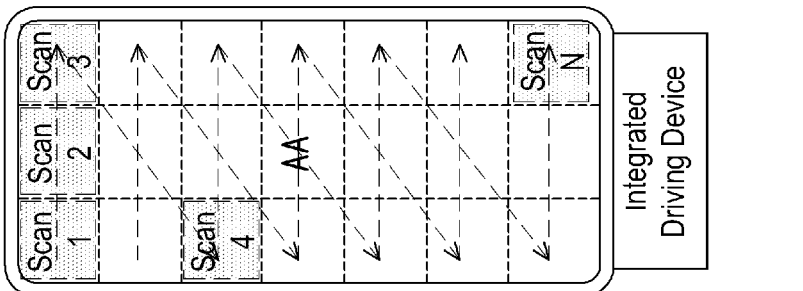
FIG. 11A and FIG. 11B are each a schematic diagram showing ambient light sensing of a plurality of zones of a sensing pixel array according to an embodiment of the disclosure.
Figure 11A:
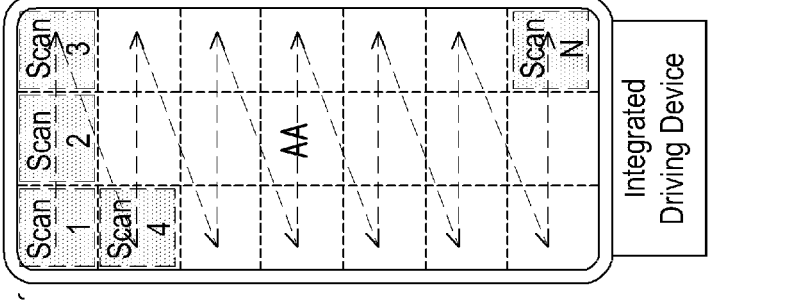

To prevent inconsistent performance degradation between the fingerprint sensors, the position of the sensing zone used in different ambient light sensing cycles may be changed, such as examples shown in FIG. 11A and FIG. 11B. FIG. 11A and FIG. 11B are each a schematic diagram showing a relationship of a plurality of light sensing cycles and corresponding sensing zones according to an embodiment of the disclosure. A sensing pixel array may be divided into a plurality of sensing zones by a horizontal direction and a vertical direction. Scan1 to ScanN denotes a plurality of light sensing cycles (or said scanning cycles) performed in an order, and each of Scan1 to ScanN are respectively remarked in the position of a corresponding sensing zone.

In the example of FIG. 11A, the optical sensing circuit 121 may start a first light sensing cycle SCAN1 for generating first ambient light information in a first frame period, and start a second optical sensing cycle SCAN2 for generating second ambient light information in a second frame period (different from the first frame period), and so on. Because the sensing pixel array are divided not only along the vertical direction but also the horizontal direction, the optical sensing circuit 121 may receive sensing signals from different group of sensing lines for different ambient light sensing cycle. In the example of FIG. 11A, sensing zones are used from left to right and from top to bottom. The sensing zones may be fully different or partially different. FIG. 11B illustrates that the position of a sensing zone used in each ambient light sensing cycle changes in a different way. Rows of sensing zones are used interlacedly from top to bottom, which means odd rows of sensing zones are used sequentially from top to bottom and then even rows of sensing zones are used sequentially from top to bottom, and with respect to each row (no matter odd or even) of sensing zones, the position of a sensing zone used in each ambient light sensing cycle changes from left to right. The position of a sensing zone used in each respective light sensing cycle may be changed in an order or randomly.

Figure 12B:
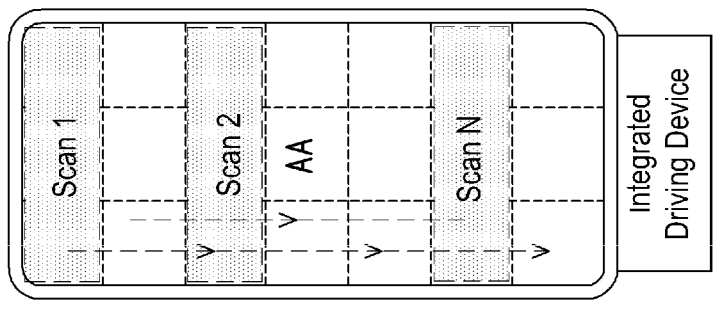
FIG. 12A and FIG. 12B are each a schematic diagram showing ambient light sensing of a plurality of zones of a sensing pixel array according to an embodiment of the disclosure.
Figure 12A:
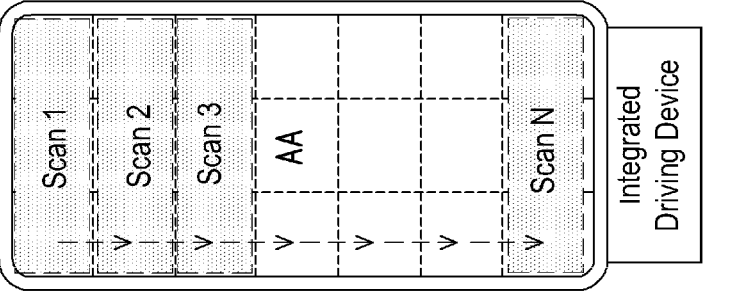

FIG. 12A and FIG. 12B are each a schematic diagram showing a relationship of a plurality of light sensing cycles and corresponding sensing zones according to an embodiment of the disclosure. In the examples of FIG. 12A and FIG. 12B, three sensing zones in the horizontal direction is used in each light sensing cycle. Scan1 to ScanN denotes a plurality of light sensing cycles (or said scanning cycles) performed in an order and each of Scan1 to ScanN are respectively remarked in the position of a corresponding sensing zone. With reference to FIG. 12A, the position of a sensing zone used in each ambient light sensing cycle changes from top to bottom. With reference to FIG. 12B, the position of a sensing zone used in each ambient light sensing cycle changes interlacedly from top to bottom, which means odd sensing zones are used sequentially from top to bottom then even sensing zones are used sequentially from top to bottom. The position of a sensing zone used in each respective light sensing cycle may be changed in an order or randomly.

Figure 13:
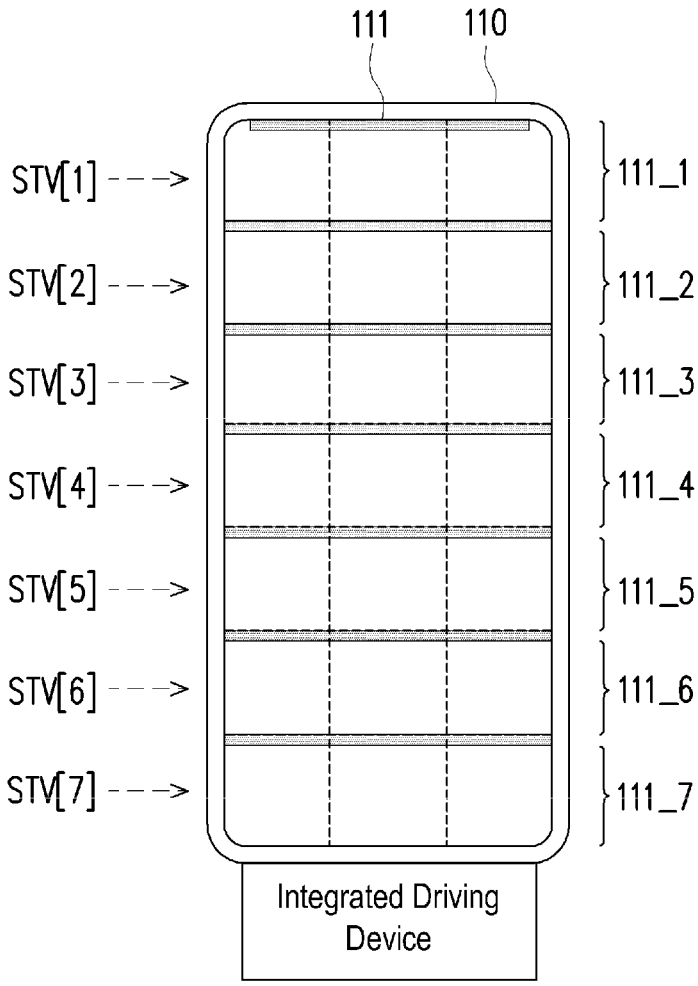
FIG. 13 is a schematic diagram showing ambient light sensing of a plurality of zones of a sensing pixel array according to an embodiment of the disclosure.

FIG. 13 is a schematic diagram showing ambient light sensing of a plurality of zones of a sensing pixel array according to an embodiment of the disclosure. With reference to FIG. 13, each of the sensing zones 111_1 to 111_7 includes Y fingerprint sensing pixel rows (Y is a positive integer), and a part of the fingerprint sensing pixel rows in each of the sensing zones serve for ambient light sensing. In this embodiment, only the $1^{st}$ to $3^{rd}$ rows of the fingerprint sensing pixel rows in each sensing zone serve for ambient light sensing, and may be designed to be turned on in sequence or at the same time. For each fingerprint sensing channel of the optical sensing circuit 121, the sensing signal obtained during one readout period may include the summed sensing result of multiple fingerprint sensing pixel rows. The optical sensing circuit 121 may perform average brightness calculation on the sensing signals read back to obtain ambient light information.

Figure 14A:
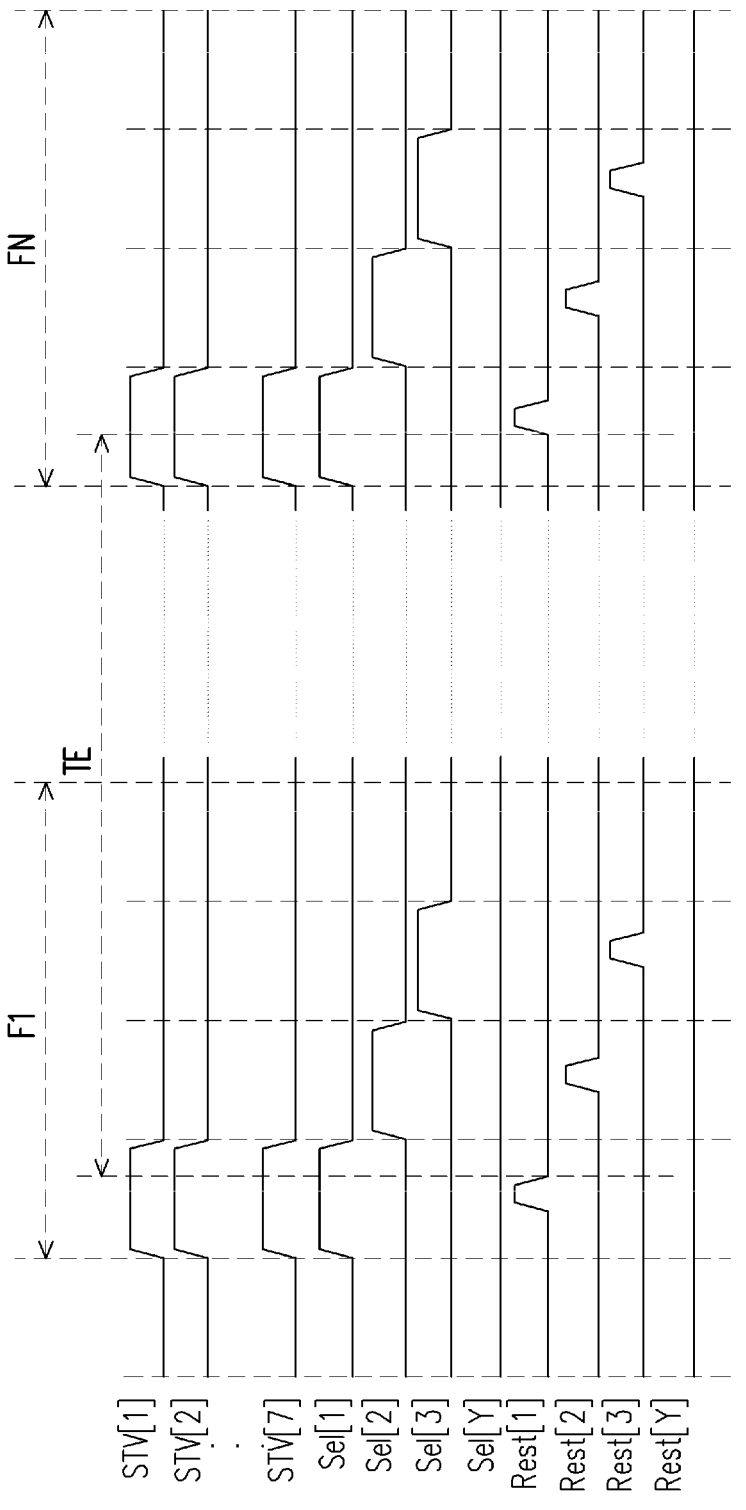
FIG. 14A is a timing diagram of ambient light sensing according to an embodiment of the disclosure.
Figure 14B:
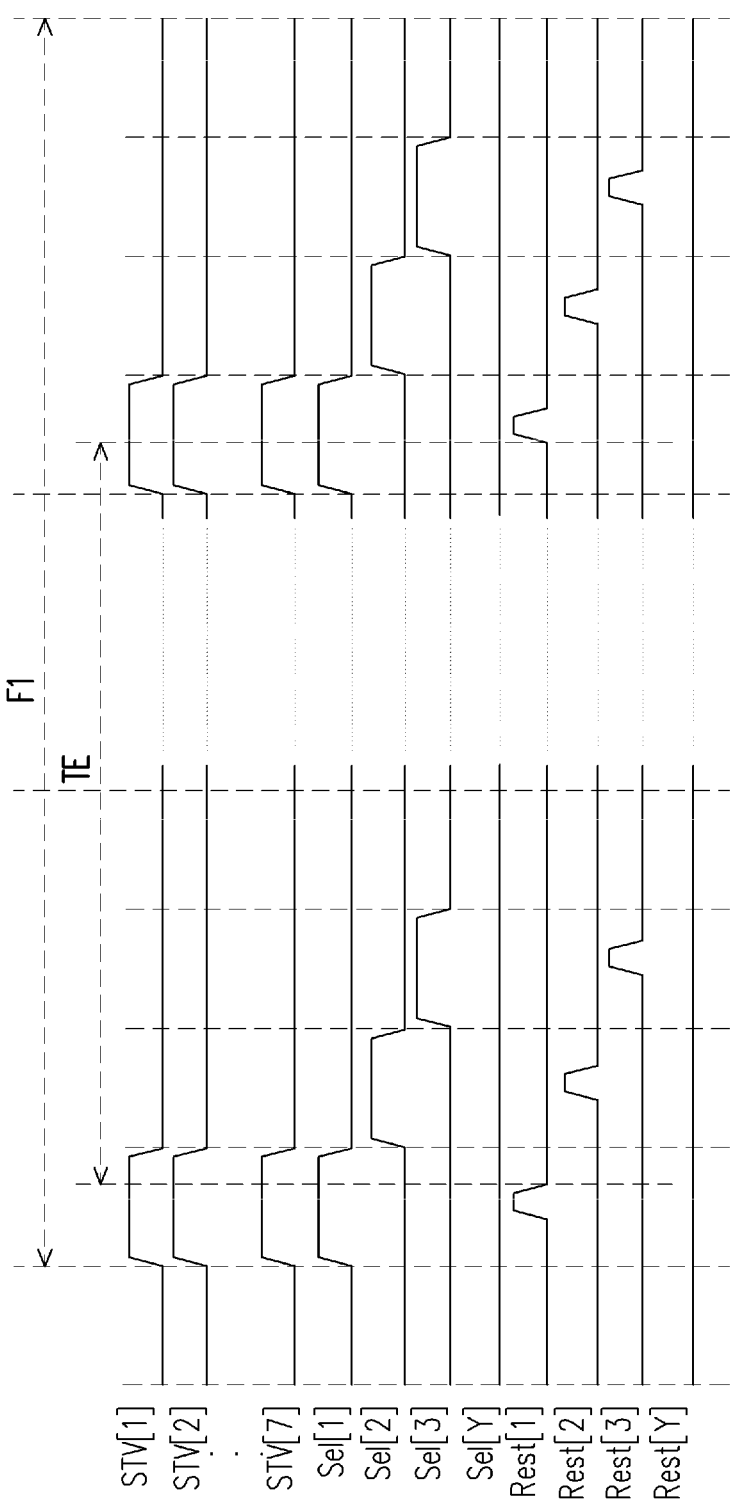
FIG. 14B is a timing diagram of ambient light sensing according to an embodiment of the disclosure.

FIG. 14A is a timing diagram of ambient light sensing according to an embodiment of the disclosure. FIG. 14A is further to describe the embodiment shown in FIG. 13, in which, through the start pulse signals STV[1] to STV[7] where each start pulse signal has active pulses, the first row of the fingerprint sensing pixel rows of each sensing zone is turned on at the same time. The reset signals Rest[1] to Rest[3] have active pulses such that the $1^{st}$ to $3^{rd}$ fingerprint sensing pixel rows of each sensing zone are reset sequentially. The reset signals Rest[4] to Rest[Y] do not have active pulses. The select signals Sel[1] to Sel[3] have active pulses such that the $1^{st}$ to $3^{rd}$ fingerprint sensing pixel rows of each sensing zone are readout sequentially. The select signals Sel[4] to Sel[Y] do not have active pulses. As shown, the exposure period required for ambient light sensing is long such that the readout operation cannot be completed within the same fame period where the reset operation is performed. FIG. 14B is a timing diagram of ambient light sensing according to an embodiment of the disclosure. FIG. 14B is also further to describe the embodiment shown in FIG. 13. Compared with FIG. 14A, in FIG. 14B, the exposure period required for ambient light sensing is short such that reset operation and the readout operation of an ambient light sensing cycle are completed in a frame period F1.

Figure 15:
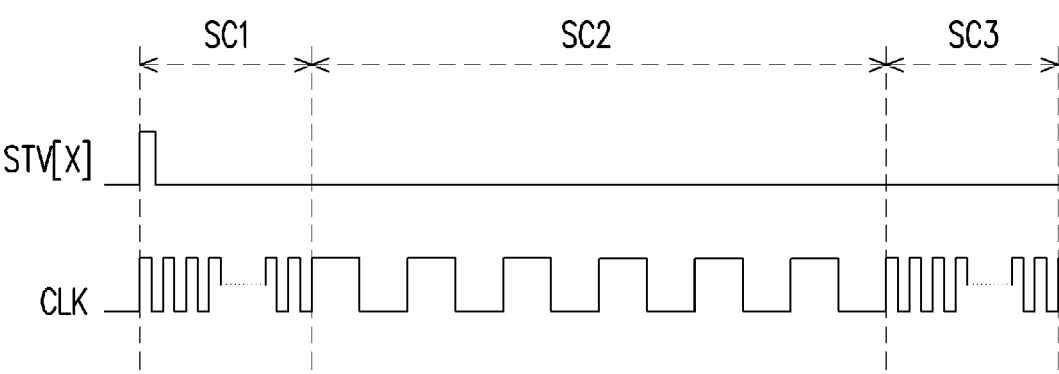
FIG. 15 is a schematic waveform diagram of performing "fast skip" according to an embodiment of the disclosure.

Furthermore, a "fast skip" function may be further integrated into the embodiment shown in FIG. 13. The "fast skip" serves to quickly scan unused sensing pixel rows. FIG. 15 is a schematic waveform diagram of performing "fast skip" according to an embodiment of the disclosure. With reference to FIG. 15, after a start pulse signal STV[X] is pulled up, scanning is performed on the sensing pixel rows. In an embodiment, X is a positive integer and $1 \leq X \leq 7$. As shown, the width of each pulse of a clock signal CLK in scanning intervals SC1 and SC3 is reduced, such that the unused sensing pixel rows may be quickly scanned. The width of each pulse of the clock signal CLK in a scanning interval SC2 remains normal, such that the used sensing pixel rows may be scanned normally. Moreover, the fingerprint sensing pixel rows scanned in the same sensing zone may be made different (or not completely the same) each time, in case that long-term and fixed-position detection results in excessive difference in performance degradation between the fingerprint sensing pixels therein and other regions.

Figure 16:
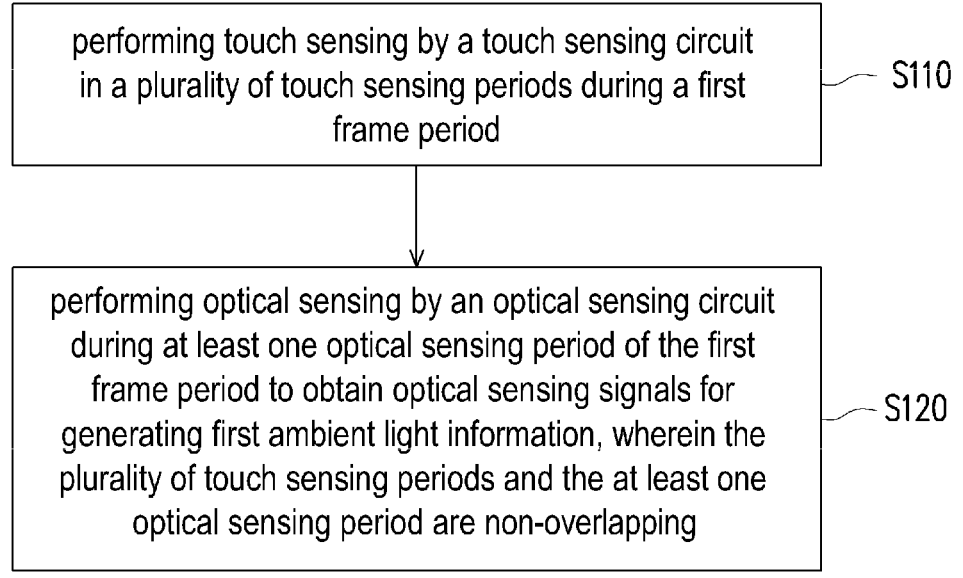
FIG. 16 is a flowchart of an operation method of an integrated driving device according to an embodiment of the disclosure.

FIG. 16 is a flowchart of an operation method of an integrated driving device according to an embodiment of the disclosure. With reference to FIG. 1 and FIG. 16 together, the integrated driving device includes at least the optical sensing circuit 121 and the touch sensing circuit 1221. In step S110, touch sensing is performed by the touch sensing circuit 1221 in a plurality of touch sensing periods during a first frame period. In step S120, optical sensing is performed by the optical sensing circuit 121 during at least one optical sensing period during the first frame period to obtain optical sensing signals for generating first ambient light information. The touch sensing periods and the optical sensing period are non-overlapping.

In terms of hardware, the blocks of the application processor 130, the optical sensing circuit 121, the touch sensing circuit 1221, and the display driving circuit 1222 may be logic circuits implemented on an integrated circuit. Relevant functions of the application processor 130, the optical sensing circuit 121, the touch sensing circuit 1221, and the display driving circuit 1222 may be implemented in a hardware form by utilizing hardware description languages (e.g., Verilog HDL or VHDL) or other appropriate programming languages. For example, the relevant functions of the application processor 130, the optical sensing circuit 121, the touch sensing circuit 1221, and the display driving circuit 1222 may be implemented in one or more controllers, microcontrollers, microprocessors, application-specific integrated circuits, (ASIC), digital signal processors (DSP), field programmable gate arrays (FPGA) and/or various logic blocks, modules, and circuits in other processing units.

In terms of software and/or firmware, the relevant functions of the application processor 130, the optical sensing circuit 121, the touch sensing circuit 1221, and the display driving circuit 1222 may be implemented as programming codes. For example, the application processor 130, the optical sensing circuit 121, the touch sensing circuit 1221, and the display driving circuit 1222 may be implemented by utilizing general programming languages (e.g., C, C++, or assembly language) or other appropriate programming languages. The programming codes may be recorded/stored in a recording medium, and the recording medium includes, for example, a read only memory (ROM), a storage device, and/or a random access memory (RAM). A computer, central processing unit (CPU), controller, microcontroller, or microprocessor may read and execute the programming codes from the recording medium to achieve the relevant functions. A "non-transitory computer readable medium", such as a tape, disk, card, semiconductor memory, programmable logic circuit, etc., may serve as the recording medium. In addition, the programs may also be provided to the computer (or CPU) through any transmission medium (communication network, broadcast radio wave, or the like). The communication network is, for example, the Internet, wired communication, wireless communication, or other communication media.

In summary of the foregoing, the in-display fingerprint sensor of the disclosure may be configured to perform not only fingerprint sensing but also ambient light sensing (collectively referred to as optical sensing). In addition, the backlight brightness of the screen of the handheld electronic device may be dynamically adjusted according to the sensed ambient light information. Moreover, the length of the exposure period of the subsequent fingerprint recognition may be dynamically adjusted according to the sensed ambient light information. In this way, an standalone ambient light sensor in the handheld electronic device is not required, and various applications may be executed based on the sensed ambient light information.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operation method of an integrated driving device, comprising:

performing touch sensing in a plurality of first touch sensing periods in a first frame period;

outputting data voltages in a plurality of display periods in the first frame period;

performing ambient light sensing during a porch interval in the first frame period to obtain an ambient light sensing signal, wherein outputting the data voltages is being stopped in the porch interval;

performing another touch sensing in a plurality of second touch sensing periods in a third frame period in which a display driving circuit of the integrated driving device is operated in a power saving mode; and performing another ambient light sensing in a plurality of ambient light sensing periods in the third frame period, wherein under the power saving mode, the plurality of ambient light sensing periods are separated by at least some of the second touch sensing periods.

2. The operation method according to claim 1, wherein the plurality of display periods in the first frame period and the plurality of first touch sensing periods in the first frame period are non-overlapping.

3. The operation method according to claim 1, further comprising:

starting performing a fingerprint sensing cycle during a second frame period later than the first frame period, wherein a length of an exposure period of the fingerprint sensing cycle is determined according to first ambient light information generated based on the ambient light sensing signal obtained in the first frame period.

4. The operation method according to claim 3, wherein the length of the exposure period is inversely related to a light intensity indicated by the first ambient light information.

5. An integrated driving device, comprising:

a first sensing circuit, configured to perform touch sensing in a plurality of first touch sensing periods in a first frame period;

a display driving circuit, configured to output data voltages in a plurality of display periods in the first frame period; and a second sensing circuit, configured to perform ambient light sensing during a porch interval in the first frame period to obtain an ambient light sensing signal, wherein outputting the data voltages is being stopped in the porch interval; and wherein the first sensing circuit is further configured to perform another touch sensing in a plurality of second touch sensing periods in a third frame period in which the display driving circuit of the integrated driving device is operated in a power saving mode, wherein the second sensing circuit is further configured to perform another ambient light sensing in a plurality of ambient light sensing periods in the third frame period, wherein under the power saving mode, the plurality of ambient light sensing periods are separated by at least some of the second touch sensing periods.

6. The integrated driving device according to claim 5, wherein the plurality of display periods in the first frame period and the plurality of first touch sensing periods in the first frame period are non-overlapping.

7. The integrated driving device according to claim 5, further comprising:

a fingerprint sensing circuit, configured to start performing a fingerprint sensing cycle during a second frame period later than the first frame period, wherein a length of an exposure period of the fingerprint sensing cycle is determined according to first ambient light information generated based on the ambient light sensing signal obtained in the first frame period.

8. The integrated driving device according to claim 7, wherein the length of the exposure period is inversely related to a light intensity indicated by the first ambient light information.

* * * * *